(12) United States Patent
Kikuchihara et al.

(10) Patent No.: US 6,798,100 B2
(45) Date of Patent: Sep. 28, 2004

(54) MOTOR AND ATTACHMENT STRUCTURE

(75) Inventors: Takashi Kikuchihara, Tokyo (JP); Yoshio Suimon, Tokyo (JP)

(73) Assignee: Tomy Company, Ltd., Tokyo (JP)

( * ) Notice: Subject to any disclaimer, the term of this patent is extended or adjusted under 35 U.S.C. 154(b) by 0 days.

(21) Appl. No.: 09/734,703

(22) Filed: Dec. 13, 2000

(65) Prior Publication Data

US 2001/0006313 A1 Jul. 5, 2001

(30) Foreign Application Priority Data

Dec. 24, 1999 (JP) .............................. 11-368199

(51) Int. Cl.[7] .......................... H02K 5/22; H02K 11/00; H02K 23/66
(52) U.S. Cl. ....................... 310/71; 310/81; 310/40 MM
(58) Field of Search ..................................... 310/81, 71

(56) References Cited

U.S. PATENT DOCUMENTS

| | | | | |
|---|---|---|---|---|
| 3,733,744 A | * | 5/1973 | Hiltpold et al. ............. | 446/462 |
| 3,827,181 A | * | 8/1974 | Mabuchi ...................... | 446/57 |
| 3,977,758 A | | 8/1976 | Mabuchi | |
| 4,005,320 A | | 1/1977 | Mabuchi et al. | |
| 5,343,102 A | * | 8/1994 | Mabuchi et al. .............. | 310/71 |
| 5,621,260 A | | 4/1997 | Fukuoka et al. | |
| 5,835,006 A | * | 11/1998 | Michalak et al. ........ | 340/407.1 |
| 5,889,349 A | * | 3/1999 | Yasuda ........................ | 310/261 |
| 5,986,367 A | * | 11/1999 | Tsuzaki et al. ................ | 310/71 |

FOREIGN PATENT DOCUMENTS

| | | |
|---|---|---|
| EP | 0545698 A2 | 6/1993 |
| GB | 1278362 | 6/1972 |
| GB | 1 278 362 | 6/1972 |
| GB | 1 375 723 | 1/1974 |
| GB | 2313427 A | 11/1997 |
| GB | 2 323 427 | 9/1998 |
| JP | 10-0084649 | 3/1998 |
| JP | 10-0084650 | 3/1998 |
| JP | 11-0098756 | 4/1999 |

OTHER PUBLICATIONS

J. King, et al., Vibrator Motor Bracket Used Multifunctionally As Negative Cell Fixed Contact, Motorola Technical Developments, Motorola Inc., Schaumburg, Illinois, vol. 11, Oct. 1, 1990, p. 105 XP000178644.
French Search Report in corresponding appln. No. 0016653 citing references already of record.
Belgian Search Report in corresponding appln. No. 2000/0801citing references already of record.
Netherlands Search Report in corresponding appln. No. 1016941 citing references already of record.

* cited by examiner

*Primary Examiner*—Burton S. Mullins
*Assistant Examiner*—Karen Addison
(74) *Attorney, Agent, or Firm*—Staas & Halsey LLP

(57) ABSTRACT

A motor with a plurality of electrode terminals, wherein at least a portion of a case for the motor forms at least one of the plurality of electrode terminals.

14 Claims, 10 Drawing Sheets

MOTOR AND ATTACHMENT STRUCTURE

BACKGROUND OF THE INVENTION

1. Field of the Invention

The present invention relates to a motor and an attachment structure for attaching the motor, in particular, to a structure of electrode terminals of the motor and an electric connection structure between the electrode terminals of the motor and a battery.

2. Description of Earlier Development

In general, a motor having a pair of electrode terminals, i.e., positive and negative terminals, at the rear portion thereof is known. In order to incorporate such a motor, for example, in a toy or the like, it is required to solder one end of each corresponding conductive wire (lead wire) to the corresponding electrode terminal of the motor, respectively and to connect the other end of each corresponding conductive wire to each electrode of the battery.

However, the motor with such a structure of electrode terminals has a problem of being difficult to miniaturize it. That is, in order to miniaturize the motor, when making each component part thereof small, each of two electrode terminals becomes small also. Accordingly, it is not possible to secure the rigidity of the electrode terminals and it becomes hard to solder one end of each corresponding conductive wire to the corresponding electrode terminal because the distance between the electrode terminals is also small.

SUMMARY OF THE INVENTION

An object of the invention is to provide a motor having a structure of electrode terminals which is suitable for miniaturizing itself.

Another object of the invention is to provide an improved electric connection structure between the electrode terminals of the motor and a battery.

In accordance of one aspect of the invention, in the motor with a plurality of electrode terminals, at least a portion of a case for the motor forms at least one of the plurality of electrode terminals.

According to the motor, because at least a portion of a motor case which has a relatively large surface area among the component parts forms at least one of the electrode terminals (may form all electrode terminals), it is easy to solder one end of each corresponding conductive wire to the corresponding electrode terminal and it is possible to enhance the rigidity of the electrode terminals.

Even if the rest of the electrode terminals is disposed on the end surface of the motor, because at least one of the electrode terminals is provided on the case, the rest of the electrode terminals can be made thick in comparison with the case of providing all terminals on the end surface of the motor. As a result, it is possible to make the electric connection for the rest of the electrode terminals good and also to enhance the rigidity thereof.

It is of course that provision of a plurality of electrode terminals on the peripheral surface of the case requires making a plurality of regions which are insulated to each other, on the case.

The motor may comprise two electrode terminals and a portion of the case for the motor may form at least one of the two electrode terminals.

According to such a motor, it is possible to provide almost the same function and advantageous effects as the above-described motor.

The motor may comprise two electrode terminals and at least a portion of the case for the motor may form two electrically separated regions, one of which forms one of the two electrode terminals and the other of which forms the other of the two electrode terminals.

According to the motor having such a structure, because at least a portion of a motor case which has a relatively large surface area among the component parts forms at least one of the electrode terminals, it is easy to electrically connect one end of each corresponding conductive wire to the corresponding electrode terminal and it is possible to enhance the rigidity of the electrode terminals.

The motor may comprise positive and negative electrode terminals and at least a portion of the case for the motor may form the negative electrode terminal. The motor may comprise positive and negative electrode terminals and at least a portion of the case for the motor may form the positive electrode terminal. In the cases, it is of course that the negative electrode terminal or the positive electrode terminal provision formed on the case should be insulated from the other electrode.

The other electrode terminal may be disposed on an end surface of the motor.

According to the motor having such a structure, because only one electrode terminal is provided on the end surface of the motor, the electrode terminal on the end surface can be made thick in comparison with the case of providing two terminals on the end surface of the motor. As a result, it is possible to make the electric connection for the electrode terminal on the end surface good and also to enhance the rigidity thereof.

In accordance with another aspect of the invention, in the attachment structure for attaching a motor to a battery, each of the electrode terminals of the motor as claimed in any one of the claims 2 to 6 is connected to a corresponding electrode of the battery through only a conductive member. One of the electrode terminals of the motor as claimed in any one of the claims 2 to 6 may be connected to a corresponding electrode of the battery through only a conductive member and the other of the electrode terminals of the motor may be connected to a corresponding electrode of the battery directly. For example, as the battery, a button-type one may be used.

According to such an attachment structure for attaching a motor to a battery, because each electrode terminal of the motor is connected to a corresponding electrode of the battery, through only a conductive member or directly, it is possible to reduce number of component parts for connection.

In the attachment structure, preferably, at least one of the conductive members can be brought into contact with or away from the battery or the motor. For example, as the battery, a button-type one may be used.

According to such an attachment structure, because the conductive members can be brought into contact with or away from the battery or the motor, it is possible to control on or off of the motor by being brought into contact with or away from the battery or the motor.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

DESCRIPTION OF THE PREFERRED EMBODIMENT

Figure 1:
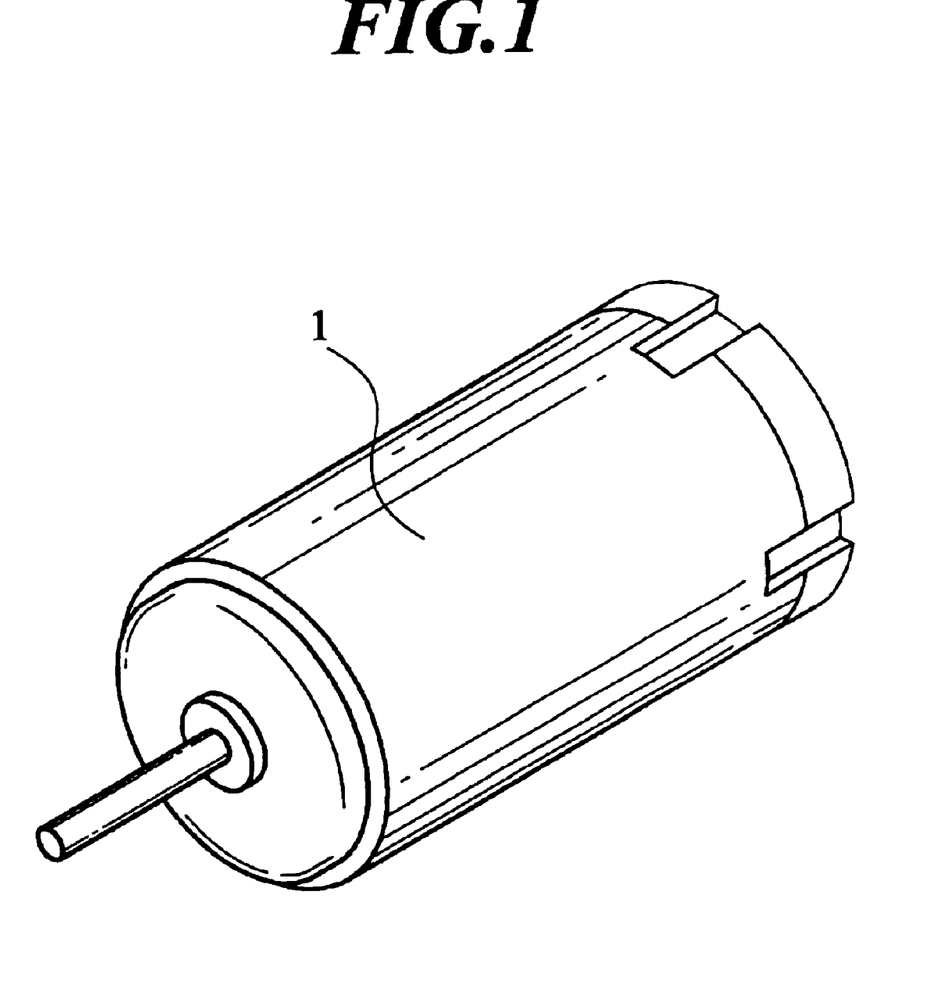
FIG. 1 is a perspective view of a motor according to an embodiment of the invention.
Figure 6:
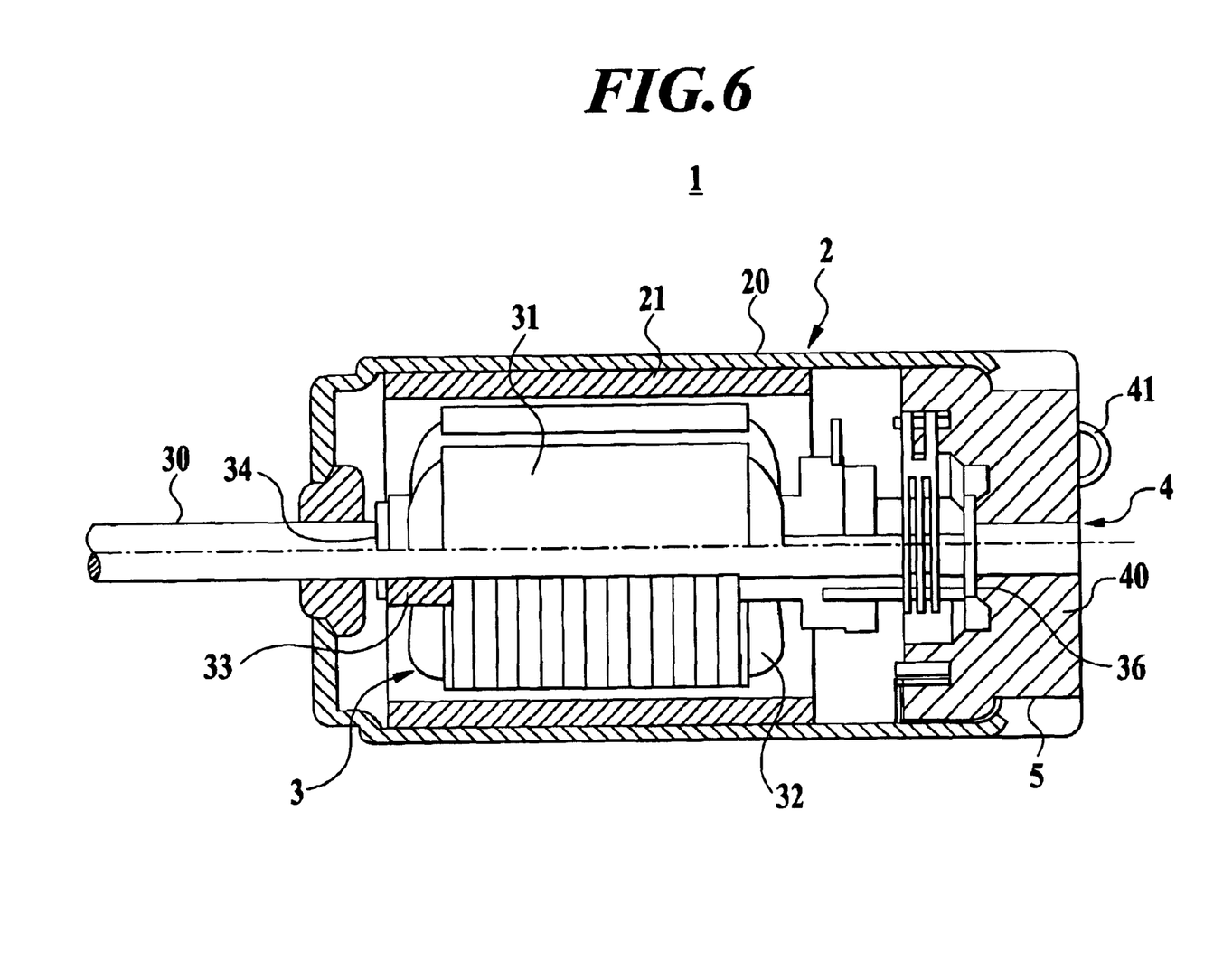
FIG. 6 is a vertical sectional view of the motor shown in FIG. 1.
Figure 7:
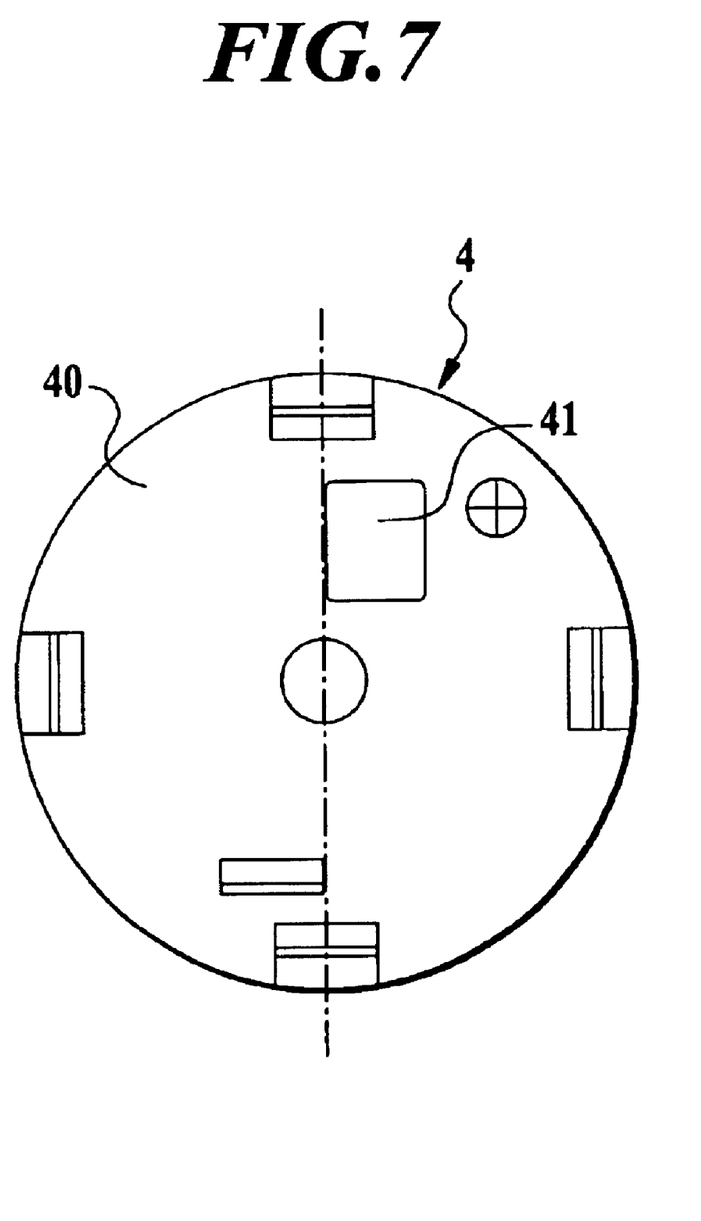
FIG. 7 is a rear view of the rotor shown in FIG. 1.

FIG. 1 is a perspective view of a motor according to an embodiment of the invention, FIG. 6 is a vertical sectional view of the motor, and FIG. 7 is a rear view of the rotor shown in FIG. 1.

Figure 2:
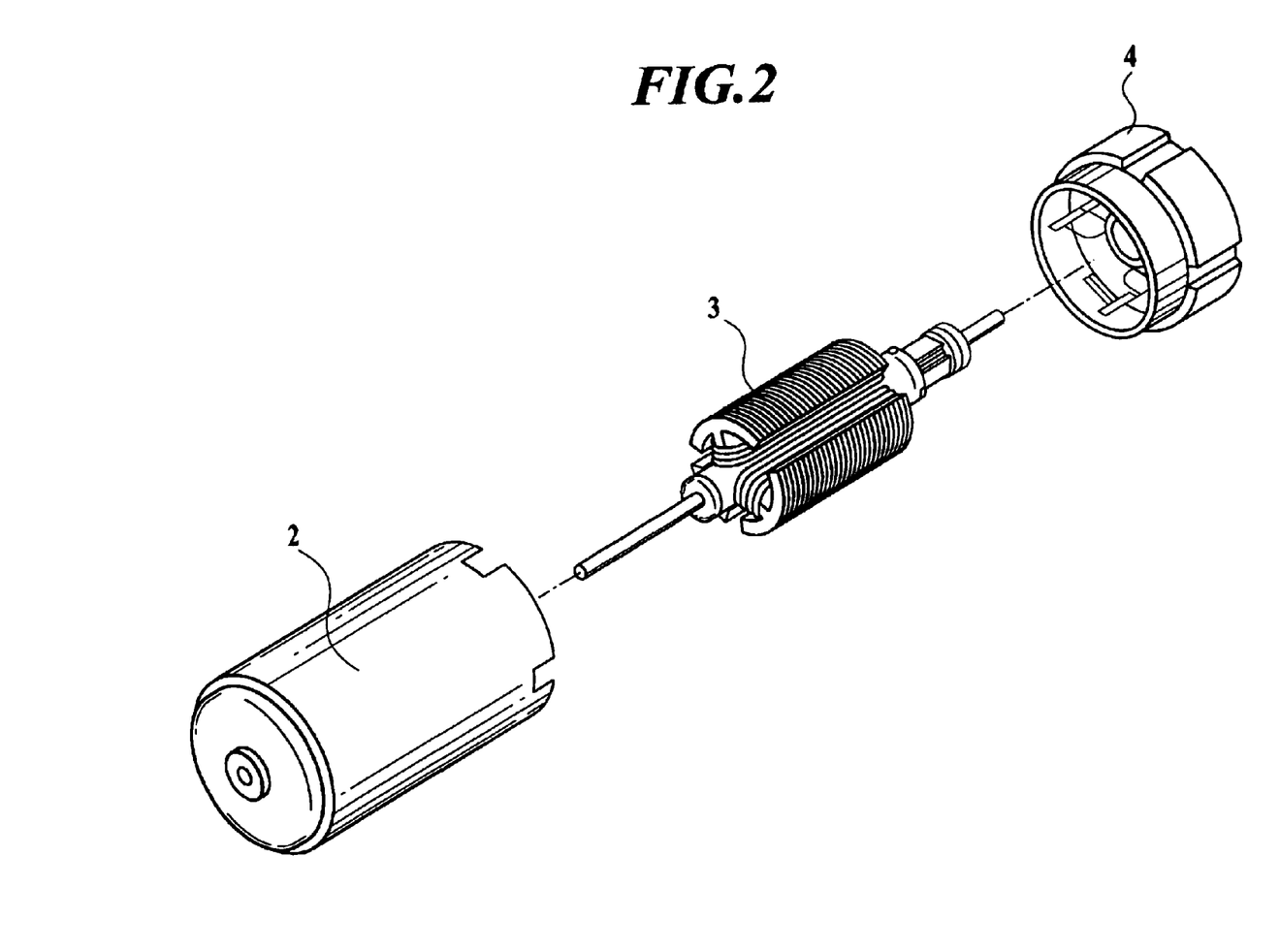
FIG. 2 is an exploded perspective view of the motor shown in FIG. 1.

The motor 1 is a DC motor and comprises a large case assembly 2, a completed rotor 3, and a small case assembly 4, as shown in FIG. 2. Next, the large case assembly 2, a completed rotor 3, and a small case assembly 4 will be explained in order, as follows.

Figure 3:
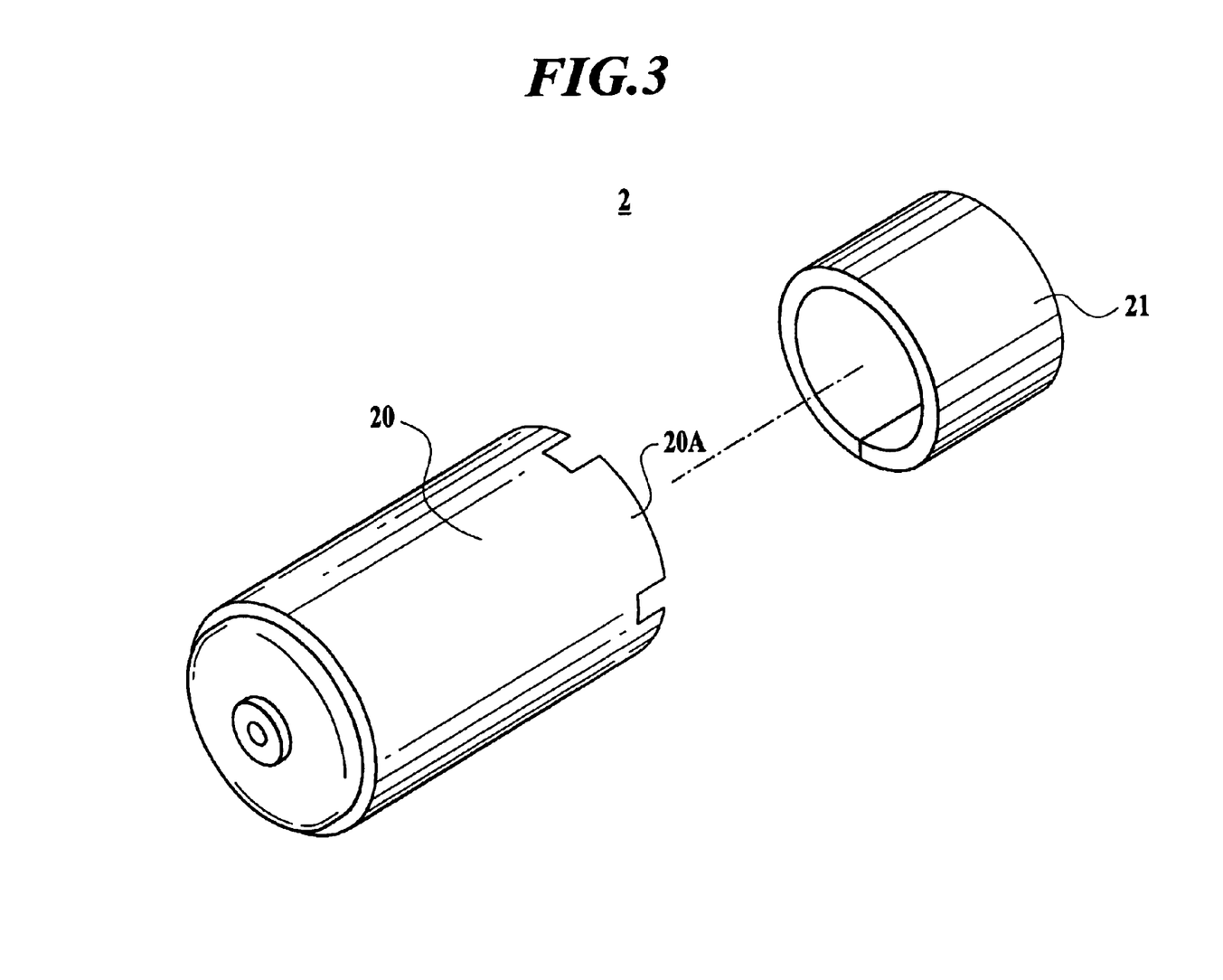
FIG. 3 is an exploded perspective view of the large case assembly shown in FIG. 2.

The large case assembly 2 comprises a cylindrical large case body 20 with an opening 20a which is formed at the rear side thereof, as shown in FIG. 3. The large case body 20 is made of a conductive material.

In the large case body 20, a cylindrical magnetic stator 21 is provided. The stator 21 is generally made of a permanent magnet or an electromagnet, to produce a constant magnetic field in the motor 1. In the embodiment, a permanent magnet is used as the stator 21.

Figure 4:
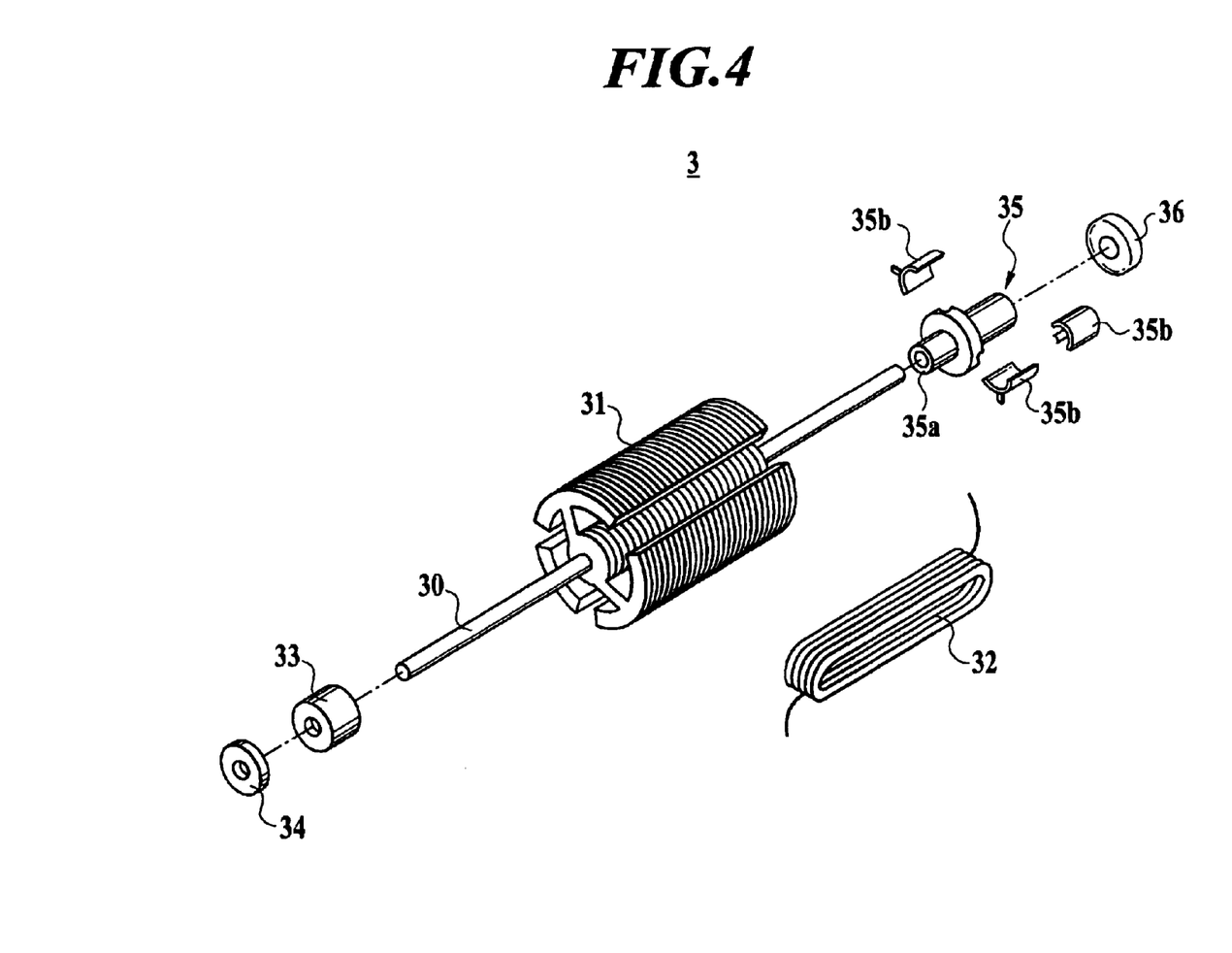
FIG. 4 is an exploded perspective view of the completed rotor shown in FIG. 2.

The completed rotor 3 comprises a core 31 attached to a rotary shaft 30, a driving coil 32 wound around the core 31, a sleeve 33 and a thrust ring 34 which are disposed in an end side on the rotary shaft 30 for sandwiching the core 31, and a commutator 35 and oil cutter 36 which are disposed in the other end side on the rotary shaft 30, as shown in FIG. 4. The commutator 35 comprises a central member 35a and commutator pieces 35b, 35b and 35b which are attached to the central member 35a.

Figure 5:
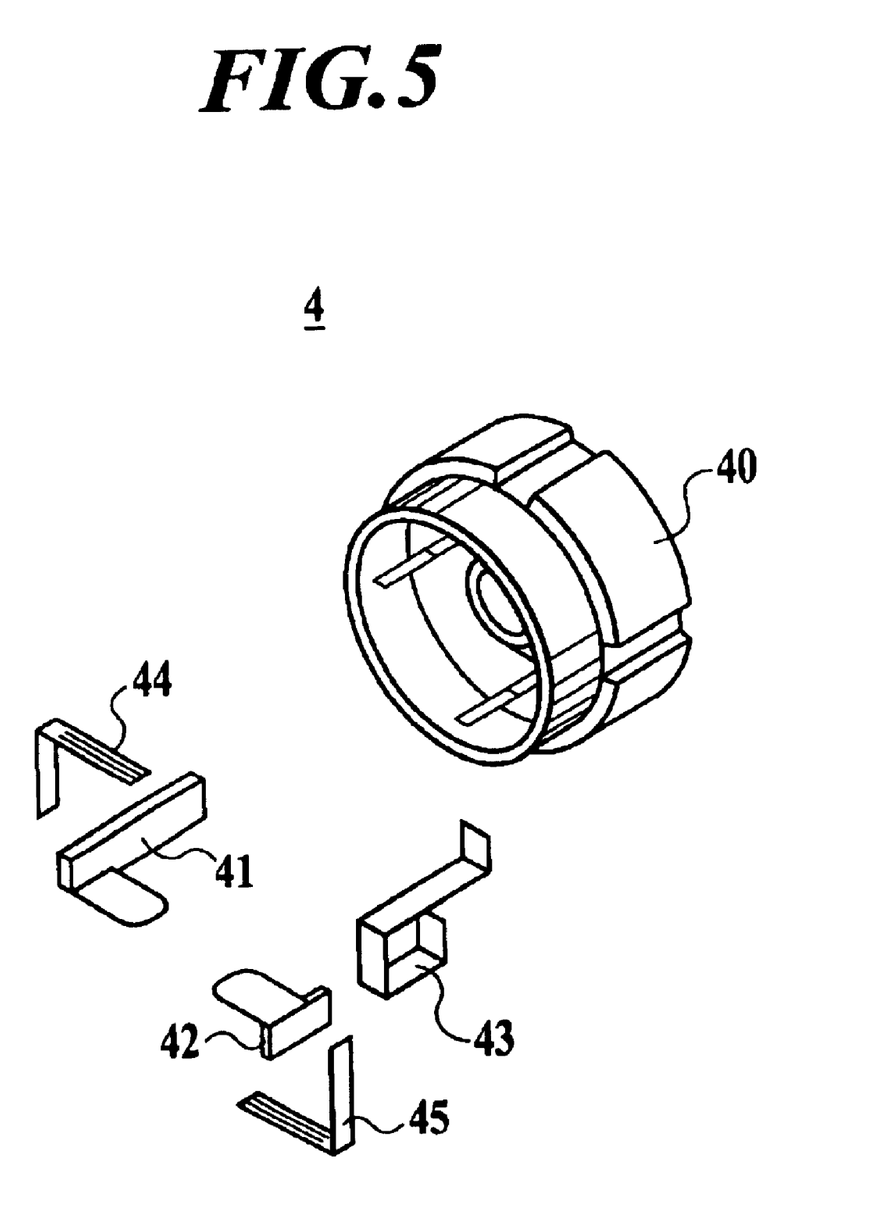
FIG. 5 is an exploded perspective view of the small case assembly shown in FIG. 2.

The small case assembly 4 comprises a small case body 40 which is fitted into the opening 20a of the large case body 20 to cover the large case body 20, as shown in FIG. 5. The small case body 40 is made of an insulating material.

The small case assembly 4 further comprises a first conductive piece 41, a second conductive piece 42, a third conductive piece 43, a first contact spring 44, and a second contact spring 45, which are attached to the small case body 40, as shown in FIG. 5. An end of the first conductive piece 4l is connected to the positive electrode of the battery B to form a positive lead terminal. The other end of the first conductive piece 41 has a structure to be able to electrically connect to the commutator 35 through the first contact spring 44. The top end of the first conductive piece 41 is bent after the first conductive piece 41 was assembled to the small case body 40. as shown in HG. 6. The second conductive piece 42 is connected to the large case body 20 through the third conductive piece 43. The large case body 20 is electrically connected to the negative electrode of the battery B. That is, the motor I has a structure of an earthed body. The second conductive piece 42 has a structure to be able to electrically connect to the commutator 35 through the second contact spring 45.

Recess portions 5 for positioning are formed at predetermined positions in the rear portion of the large case body 20 and in the small case body 40, of the motor 1. Positioning of the rotor 3 to the case assemblies can be carried out by fitting bosses which are provided at predetermined positions on an attachment portion of the rotor 3 but are not shown in figures, in the recess portions 5 for positioning.

Next, embodiments of the attachment structure for attaching the motor 1 to the battery B, according to the invention will be explained as follows.

Figure 8:
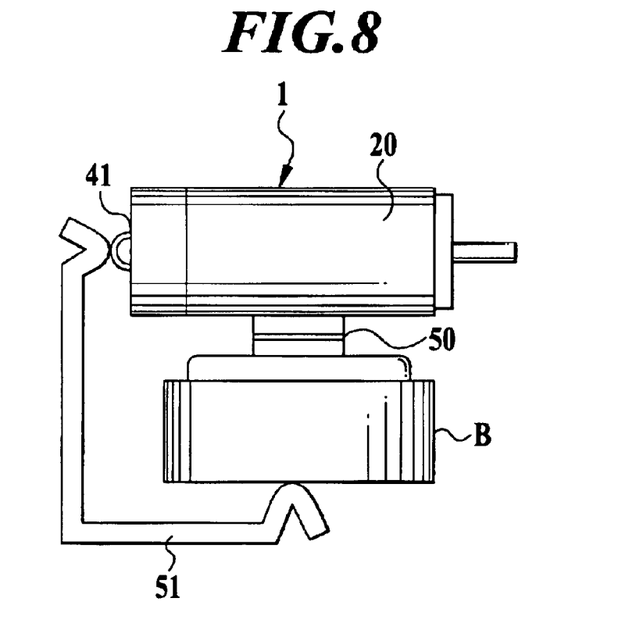
FIG. 8 is an explanation view of an attachment structure for attaching a motor to a battery, according to the first embodiment of the invention.

The first embodiment of the attachment structure for attaching the motor 1 to the button type battery B is shown in FIG. 8. In this embodiment, the motor 1 is attached to the button type battery B so that the end surface of the negative electrode of the battery B faces to the peripheral surface of the large case body 20 of the motor 1 through a conductive member 50. An end surface of the conductive member 50 to be connected with the negative electrode of the battery B is flat so as to increase the contact area with the negative electrode surface of the battery B. The other end surface of the conductive member 50 has a U-shaped or arch-shaped section to fit to the curvature of the peripheral surface of the large case body 20 of the motor 1 so as to increase the contact area with the large case body 20. On the other hand, the positive electrode surface of the battery B is electrically connected to the positive terminal (the first conductive piece) 41 of the motor 1 through a conductive member 51 which has an L-shape as a whole and both end portions bent and folded.

Figure 9:
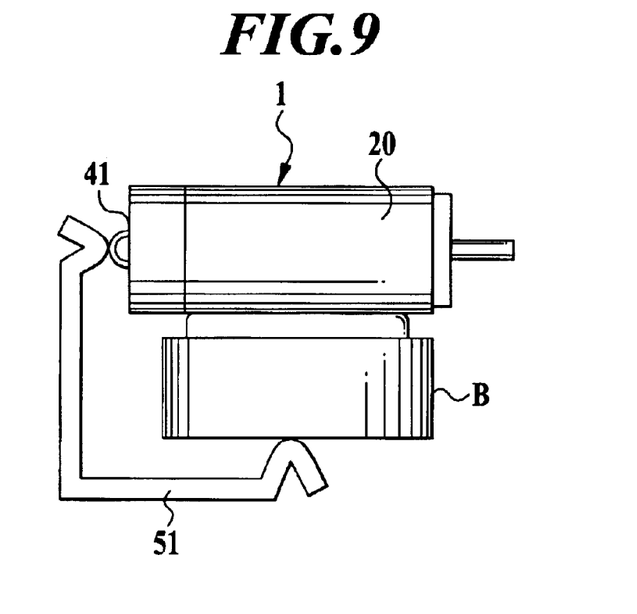
FIG. 9 is an explanation view of an attachment structure for attaching a motor to a battery, according to the second embodiment of the invention.

The second embodiment of the attachment structure for attaching the motor 1 to the button type battery B is shown in FIG. 9. This embodiment is different from the first embodiment of FIG. 8 in that the negative electrode surface of the battery B is electrically connected to the peripheral surface of the large case body 20 of the motor 1 directly without the conductive member 50 which is used in the attachment structure shown in FIG. 8.

Figure 10:
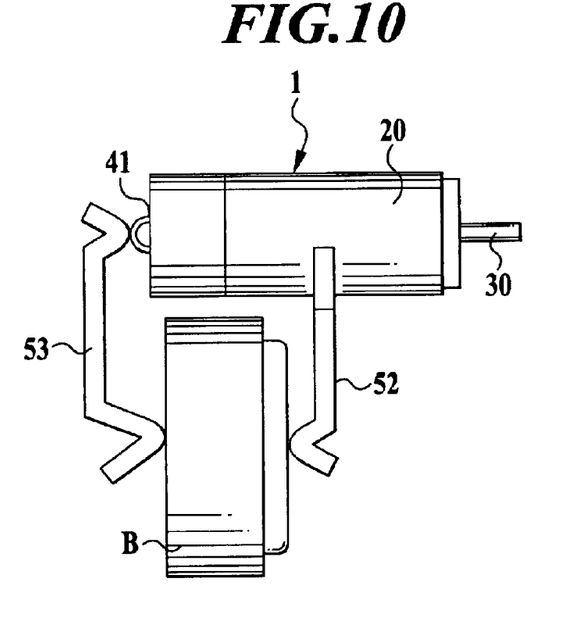
FIG. 10 is an explanation view of an attachment structure for attaching a motor to a battery, according to the third embodiment of the invention.

The third embodiment of the attachment structure for attaching the motor 1 to the button type battery B is shown in FIG. 10. In this embodiment, the motor 1 and the button type battery B are arranged so that the central axis of the button type battery B is approximately parallel to the rotary shaft 30 of the motor 1. The end surface of the negative electrode of the battery B is connected to the peripheral surface of the large case body 20 of the motor 1 through a conductive member 52. An end of the conductive member 52 is bent and folded to connect to the end surface of the negative electrode of the battery B and the other end of the conductive member 52 has a U-shaped or arch-shaped surface to fit to the curvature of the peripheral surface of the large case body 20 of the motor 1 so as to increase the contact area with the large case body 20. On the other hand, the positive electrode surface of the battery B is electrically connected to the positive terminal (the first conductive piece) 41 of the motor 1 through a conductive member 53 both end portions of which are bent and folded.

Figure 11:
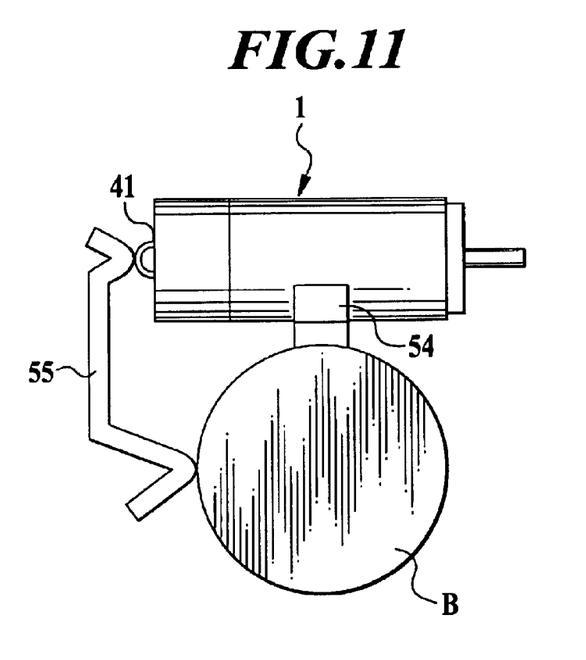
FIG. 11 is an explanation view of an attachment structure for attaching a motor to a battery, according to the fourth embodiment of the invention.

The fourth embodiment of the attachment structure for attaching the motor 1 to the button type battery B is shown in FIG. 11. In this embodiment, the motor 1 and the button type battery B are attached so that the central axis of the button type battery B is approximately perpendicular to the rotary shaft 30 of the motor 1. The end surface of the negative electrode of the battery B is connected to the peripheral surface of the large case body 20 of the motor 1 through a conductive member 54. An end of the conductive member 54 is bent and folded to connect to the end surface of the negative electrode of the battery B and the other end of the conductive member 54 has a U-shaped or arch-shaped surface to fit to the curvature of the peripheral surface of the large case body 20 of the motor 1 so as to increase the contact area with the large case body 20. On the other hand, the positive electrode surface of the battery B is electrically connected to the positive terminal (the first conductive piece) 41 of the motor 1 through a conductive member 55 both end portions of which are bent and folded.

Figure 12:
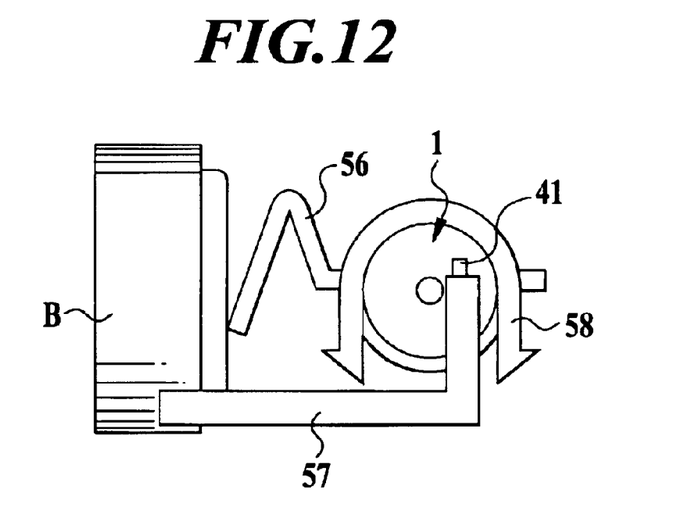
FIG. 12 is an explanation view of an attachment structure for attaching a motor to a battery, according to the fifth embodiment of the invention.

The fifth embodiment of the attachment structure for attaching the motor 1 to the button type battery B is shown in FIG. 12. In this embodiment, the motor 1 us attached to the button type battery B so that the end surface of the negative electrode of the battery B faces the peripheral surface of the large case body 20 of the motor 1 through a conductive member 56. The end surface of the negative electrode of the battery B is connected to the peripheral surface of the large case body 20 of the motor 1 through a conductive member 56. An end of the conductive member 56 is bent and folded to connect to the end surface of the negative electrode of the battery B and the other end of the conductive member 56 has a U-shaped or arch-shaped surface to fit the curvature of the peripheral surface of the large case body 20 of the motor 1 so as to increase the contact area with the large case body 20. On the other hand, the positive electrode surface of the battery B is electrically connected to the positive terminal (the first conductive piece) 41 of the motor 1 through a conductive member 57 which has an L-shape as a whole. The reference numeral 58 denotes a motor clamp for clamping the motor.

Figure 13:
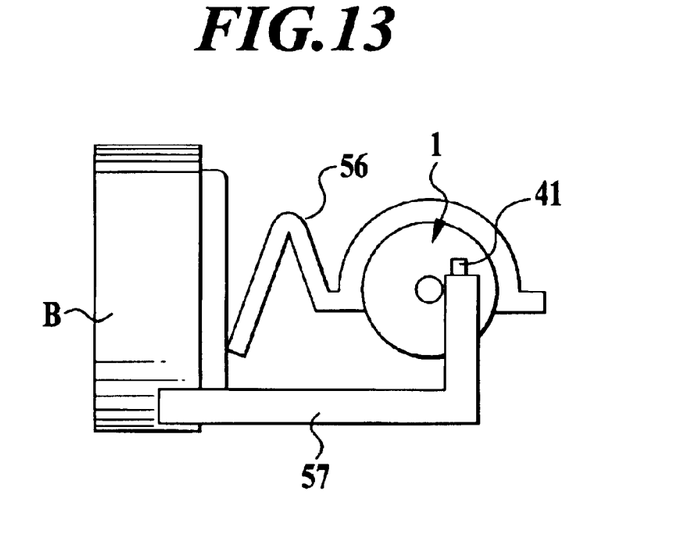
FIG. 13 is an explanation view of an attachment structure for attaching a motor to a battery, according to the six embodiment of the invention.

The sixth embodiment of the attachment structure for attaching the motor 1 to the button type battery B is shown in FIG. 13. This embodiment is almost the same as the fifth embodiment of FIG. 12 except the point that the negative electrode surface of the battery B is electrically connected to the upper peripheral surface of the large case body 20 of the motor 1 directly. According to the attachment structure, because the motor 1 can be clamped by a conductive member 56, a specific motor clamp is not required.

According to the attachment structure of each of the above-described embodiments, because the button type battery B is electrically connected to the motor 1, through a conductive member or directly, it is possible to cut off the electrical connection by moving any one of the button type battery, motor, and the conductive member.

it should also be understood that the present invention is not limited to the embodiments as above described and various changes and modifications may be made to the invention without departing from the gist thereof.

For example, although the large case body 20 makes a negative lead terminal in the above-described embodiments, the large case body 20 may make a positive lead terminal. Two electrically separated regions formed on the large case body 20 can be also adopted as positive and negative lead terminals. An exposed portion of an inner case which is provided in the large case body 20 can be also adopted as a lead terminal. Although the large case body 20 is used as a lead terminal in the above-described embodiments, it is possible to use the periphery of the small case body 40 as the terminal instead of the large case body 20.

The above-described motor can be incorporated in a small-sized vehicle model, a small-sized mascot doll, a key chain, a strap for cellular phone, a small-sized object such as an insect model and the like.

The entire disclosure of Japanese Patent Application No. Tokugan hei-11-368199 filed on Dec. 24, 1999 including specification, claims, drawings and summary are incorporated herein by reference in its entirety.

According to the motor of the present invention, because in the motor with a plurality of electrode terminals, at least a peripheral portion of a case for the motor forms at least one of the plurality of electrode terminals, the motor is suitable for miniaturizing, and it is easy to electrically connect one end of each corresponding conductive lead to the corresponding electrode terminal and it is possible to enhance the rigidity of the electrode terminals. Further, it is easy to incorporate the motor into a toy and the like, and is also easy to remove it. Further, it is possible to cut off the electrical connection to the battery easily by moving any one of the button type battery, motor, and the conductive member.

What is claimed is:

1. An attachment structure for attaching a motor to a battery, comprising:
   a motor including a motor unit having first and second electrode terminals and a cylindrical case for covering and securing the motor unit,
   wherein the cylindrical case includes a large case body having a cylindrical conductive portion which is directly electrically connected to the second electrode terminal, and an insulating small case body directly provided with the first electrode terminal; and
   a battery for driving the motor,
   wherein the first electrode terminal of the motor and the cylindrical conductive portion, are each connected to corresponding electrodes of the battery through only conductive members, respectively.

2. The attachment structure as claimed in claim 1, wherein the conductive members can be brought into contact with or away from the corresponding electrodes of the battery, the first electrode terminal of the motor, of the cylindrical conductive portion.

3. The attachment structure as claimed in claim 1, wherein the battery is a button-type.

4. The attachment structure as claimed in claim 1, wherein the motor unit further comprises a commutator and contact springs, and the first and second electrode terminals of the motor are electrically connected to the commutator through the contact springs.

5. The attachment structure as claimed in claim 1,
   wherein the motor unit further includes a rotary shaft, a commutator and a contact spring; and
   the first electrode terminal passes through the insulating small case body in an approximately parallel direction to the rotary shaft, at a distance from the rotary shaft, and includes a first end which is electrically connected to the commutator though the contact spring, and a second end which projects outwardly from the insulating small case body and is connected to a corresponding electrode of the battery through one of the conductive members.

6. The attachment structure as claimed in claim 5, wherein the second end of the first electrode terminal is turned to form a contact head.

7. The attachment structure as claimed in claim 1, wherein the large case body and the insulating small case body comprise recess portions for connecting the large case body and the insulating small case body.

8. An attachment structure for attaching a motor to a battery, comprising:

a motor including a motor unit having first and second electrode terminals and a cylindrical case for covering and securing the motor unit, wherein the cylindrical case includes a large case body having a cylindrical conductive portion which is directly electrically connected to the second electrode terminal, and an insulating small case body directly provided with the first electrode terminal; and a battery for driving the motor, wherein one of the first electrode terminal of the motor and the cylindrical conductive portion of the large case body is connected to a first electrode of the battery through only a conductive member, and the other of the first electrode terminal and the cylindrical conductive portion is connected to a second electrode of the battery directly.

9. The attachment structure as claimed in claim 8, wherein the conductive member can be brought into contact with or away from the first electrode of the battery, the first electrode terminal of the motor, or the cylindrical conductive portion.

10. The attachment structure as claimed in claim 8, wherein the battery is a button-type.

11. The attachment structure as claimed in claim 8, wherein the large case body and the insulating small case body comprise recess portions for connecting the large case body and the insulating small case body.

12. The attachment structure as claimed in claim 8, wherein the motor unit further includes a rotary shaft, a commutator and a contact spring; and the first electrode terminal passes through the insulating small case body in an approximately parallel direction to the rotary shaft, at a distance from the rotary shaft, and includes a first end which is electrically connected to the commutator though the contact spring, and a second end which projects outwardly from the insulating small case body and is connected to a corresponding electrode of the battery through one of the conductive members.

13. The attachment structure as claimed in claim 12, wherein the second end of the first electrode terminal is turned to form a contact head.

14. The attachment structure as claimed in claim 8, wherein the motor unit further comprises a commutator and contact springs, and the first and second electrode terminals of the motor are electrically connected to the commutator through the contact springs.

* * * * *

UNITED STATES PATENT AND TRADEMARK OFFICE
CERTIFICATE OF CORRECTION

PATENT NO. : 6,798,100 B2  
DATED : September 28, 2004  
INVENTOR(S) : Takashi Kikuchihara et al.

It is certified that error appears in the above-identified patent and that said Letters Patent is hereby corrected as shown below:

Title page,  
Item [56], References Cited, OTHER PUBLICATIONS, insert the following:  
-- IBM Technical Disclosure Bulletin, Vol. 30, No. 9, 09-02-1998, pp. 138-139  
Japanest Publication No. 10-0084649, dated March 31, 1998  
Japanese Publication No. 10-0084650, dated March 31, 1998  
Japanese Publication No. 11-0098756, dated April 9, 1999  
British Examination Report in corresponding Application No. 0030795.9 --

Column 3,  
Line 63, change "cover" to -- close --.

Column 4,  
Line 10, change "40." to -- 40, --, and change "HG" to -- FIG --.  
Line 14, change "I" to -- 1 --.

Column 5,  
Line 29, change "us" to -- is --.  
Line 63, change "it" to -- lt --.

Column 6,  
Line 51, please change "motor, of" to -- motor, or --.

Column 8,  
Line 19, change "through one of" to -- directly or through --; and  
Line 20, change "members" to -- member --.

Signed and Sealed this

Tenth Day of May, 2005

JON W. DUDAS  
*Director of the United States Patent and Trademark Office*